(12) United States Patent
Jokinen et al.

(10) Patent No.: US 8,385,919 B1
(45) Date of Patent: Feb. 26, 2013

(54) MECHANISM TO UPDATE THE CSG CELL ACCESS CHECK UPON PLMN CHANGE AT HANDOVER

(75) Inventors: Harri A. Jokinen, Pertteli (FI); Guillaume Sebire, Espoo (FI); Vlora Rexhepi-Van Der Pol, ML Den Hoom (NL)

(73) Assignee: Renesas Mobile Corporation, Tokyo (JP)

( * ) Notice: Subject to any disclaimer, the term of this patent is extended or adjusted under 35 U.S.C. 154(b) by 0 days.

(21) Appl. No.: 13/554,764

(22) Filed: Jul. 20, 2012

Related U.S. Application Data

(63) Continuation of application No. 13/214,528, filed on Aug. 22, 2011.

(30) Foreign Application Priority Data

Aug. 22, 2011  (GB) .................................. 1114430.0

(51) Int. Cl.
*H04W 36/00* (2009.01)
(52) U.S. Cl. ..... 455/436; 455/437; 455/438; 455/435.1; 455/439
(58) Field of Classification Search .... 455/435.1–435.3, 455/436–439
See application file for complete search history.

(56) References Cited

U.S. PATENT DOCUMENTS

| | | | |
|---|---|---|---|
| 2009/0086672 A1* | 4/2009 | Gholmieh et al. | 370/329 |
| 2009/0239533 A1* | 9/2009 | Somasundaram et al. | 455/434 |
| 2011/0014917 A1* | 1/2011 | Wager et al. | 455/438 |
| 2011/0171915 A1* | 7/2011 | Gomes et al. | 455/73 |

FOREIGN PATENT DOCUMENTS

WO  WO 2010/151805 A1  12/2010

OTHER PUBLICATIONS

TSG SA Meeting #51, "LS on Equivalent PLMN", Bratislava, Slovakia Jun. 6-8, 2011 SP-110405 (1 page).
3GPP TSG SA WG2 Meeting #85, "InterPLMN Handover to a CSG Cell", S2-112640, Xian, China, May 16-20, (4 pages).
3GPP TS 24.008 V10.3.0 (Jun. 2011), Technical Specification, $3^{rd}$ Generation Partnership Project; Technical Specification Group Core Network and Terminals; Mobile Radio Interface Layer 3 Specification; Core Network Protocols; Stage 3, (Release 10), (pp. 1-24, 91-92 and 304-305).
3GPP TS 31.102 V10.2.0 (Jun. 2011), Technical Specification, $3^{rd}$ Generation Partnership Project; Technical Specification Group Core Network and Terminals; Characteristics of the Universal Subscriber Identity Module (USIM) Application, (Release 10), (pp. 1-8 and 85).

(Continued)

*Primary Examiner* — Kiet Doan
*Assistant Examiner* — Dung Lam
(74) *Attorney, Agent, or Firm* — Lucas & Mercanti LLP; Robert P. Michal

(57) ABSTRACT

Solving dual errors for user equipment UE checking whether a private cell is allowed when handing over between serving and target cells, where the PLMN and/or EPLMNs list of the serving and target cells may differ. The serving cell may send a one-bit indication that there is a change in a handover command or system information SI6 message after which the UE may or may not refrain from reporting new cells until it performs a registration/location area update in the target cell. The target cell may trigger in the UE a registration update then provide the UE with the PLMN of the target cell. The serving cell can provide the PLMN of the target cell in a SI6 message or handover command, which the UE may use in place of or in addition to the PLMN/EPLMN of the serving cell when checking whether a private/closed subscriber group cell is allowed.

5 Claims, 6 Drawing Sheets

OTHER PUBLICATIONS

3GPP TS 48.008 V10.2.0 (Jun. 2011), Technical Specification, $3^{rd}$ Generation Partnership Project; Technical Specification Group GSM/EDGE Radio Access Network; Mobile Switching Centre—Base Station System (MSC-BSS) Interface; Layer 3 Specification (Release 10), (pp. 1-10 and 90-92).

3GPP TS 44.018 V10.3.0 (Jun. 2011), Technical Specification, $3^{rd}$ Generation Partnership Project; Technical Specification Group GSM/EDGE Radio Access Network; Mobile Radio Interface Layer 3 Specification; Radio Resource Control (RRC) Protocol (Release 10), (pp. 1-17 and 168-169).

3GPP TS 43.022 V10.0.0 (Mar. 2011), Technical Specification, $3^{rd}$ Generation Partnership Project; Technical Specification Group GSM/EDGE Radio Access Network; Functions related to Mobile Station (MS) in idle Mode and Group Receive Mode (Release 10), (pp. 1-24).

3GPP TS 23.122 V10.4.0 (Jun. 2011), Technical Specifications, $3^{rd}$ Generation Partnership Project; Technical Specification Group Core Network and Terminals; Non-Access-Stratum (NAS) Functions Related to Mobile Station (MS) in Idle Mode, (Release 10), (pp. 1-44).

* cited by examiner

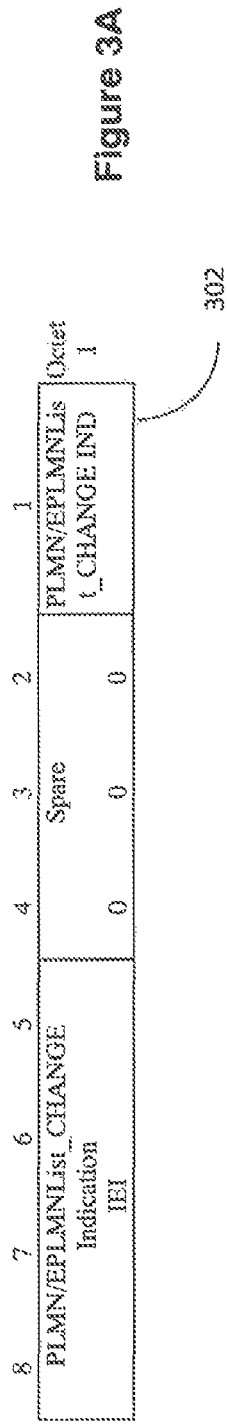

452: during a handover of a UE in a dedicated or connected mode from a serving cell to a target cell, receive signaling indicating that there is a change to at least one of a public land mobile network PLMN and a list of equivalent PLMNs between a serving cell and a target cell

↓

454: utilize at least one updated PLMN to check whether a private cell is allowed for the UE 456: the indication is one bit in a PLMN/EPLMNList_CHANGE indication information element which the UE receives from the serving cell in a HANDOVER COMMAND message 458: the updated PLMN is obtained during a location or registration area update; and the UE refrains from reporting private cells/CSGs after the handover until the location or registration area update 460: the updated PLMN is the PLMN of the target cell that the UE obtains during a location or registration area update that is triggered in the UE by the target cell 462: the updated PLMN comprises the PLMN of the target cell which the apparatus receives from the serving cell in one of a system information SI6 message or a location or registration area update message

Figure 4B

MECHANISM TO UPDATE THE CSG CELL ACCESS CHECK UPON PLMN CHANGE AT HANDOVER

CROSS-REFERENCE TO RELATED APPLICATIONS

This is a Continuation of U.S. patent application Ser. No. 13/214,528, filed Aug. 22, 2011, and claims the benefit under 35 U.S.C. 119 of GB 1114430.0, filed Aug. 22, 2011, the entire disclosure of each of which is incorporated herein by reference.

TECHNICAL FIELD

The exemplary and non-limiting embodiments of this invention relate generally to wireless communication systems, methods, devices and computer programs, and more specifically relate to updating and maintaining corrects lists at a user equipment for closed subscriber group cells.

BACKGROUND

The following abbreviations used in the specification and/or the drawings are defined as follows:
  3GPP third generation partnership project
  BSS base station system
  CSG closed subscriber group
  DL downlink (network towards UE)
  eNodeB base station of a LTE/LTE-A system
  EPLMN equivalent PLMN
  E-UTRAN evolved UTRAN
  GERAN GSM/edge radio access network
  GSM global system for mobile communications
  ID identifier
  LAU location area update
  LTE long term evolution (of the UTRAN system)
  MME mobility management entity
  MSC mobile switching center
  NAS network access stratum
  PLMN public land mobile network
  S-GW serving gateway
  RAT radio access technology
  RR radio resource
  UE user equipment
  UL uplink (UE towards network)
  UMTS universal mobile telecommunication system
  UTRAN universal terrestrial radio access network In the E-UTRAN system relevant to these teachings there are conventional network access nodes/cells termed eNodeBs which serve all users, and also subscriber group CSG cells such as home eNodeBs which are available for traffic (voice and/or data) to only those subscribers registered with the CSG and possibly also certain allowed guests. Any given CSG may include a group of cells (such as a corporate or university campus) or a single cell. CSGs may allow traffic access for non-subscribers for emergency calls but these teachings relate to routine, non-emergency access.

These different types of cells or access nodes may be termed more generally as public access nodes/public cells and private access nodes/private cells. Other wireless systems (GERAN, GSM, UTRAN, WCDMA) have either implemented or are considering implementing similar such private cells as more functionality is shifted from higher in the radio access network toward the base stations/access nodes. In these systems the UE is to keep a list, termed a CSG whitelist or CSG allowed list, which recites all the identities of the CSG cells for which that particular UE has access rights. Other radio access technologies RATs use similar whitelists which may be known by different terms. For LTE and UMTS the CSG whitelist is a combination of the UE's allowed CSG list and the operator's CSG list (see for example 3GPP TS 2342.2 v10.4.0 for further details).

Many mobile user radios are now capable of operating in multiple RATs, and the examples below are in the non-limiting context of a HE handing over between GERAN cells and checking if a nearby UTRAN/LTE CSG cell is allowed. In recent 3GPP discussions related to the handling of the CSG whitelists when the UE performs its access check (where the UE checks if a given CSG is allowed or not) prior to reporting of the CSG cell resulted in agreement that the UE should take into account the list of "equivalent PLMNs" in addition to the registered and selected PLMN (see for example document SP-110415 entitled LS ON EQUIVALENT PLMN [TSG SA Meeting #51; Bratislava, Slovakia; 6-8 Jun. 2011]. The CSG whitelist contains [CSG ID, PLMN ID] pairs indicating which CSGs in which PLMNs the mobile station is allowed to access. Hence a CSG cell is allowed for a UE if, in addition to the cell's CSG ID being in the whitelist, its associated PLMN ID is determined as a valid one by the UE, valid being equal to the PLMN ID of the selected PLMN or the registered PLMN or one of the PLMNs in its EPLMN list. In dedicated mode, the registered and selected PLMNs are the same.

3GPP TS 24.008 v10.3.0 (2011-06) provides that the UP, will locally store a list of EPLMNs received from the network in which it is registered. This list is replaced or deleted at the end of each location/registration update procedure, routing area update procedure and CPRS attach procedure. The stored list consists of a list of equivalent PLMNs as downloaded by the network plus the PLMN code of the registered PLMN that downloaded the list. A problem arises in that when handing over between cells, the UE will not always have the correct PLMN/EPLMN and so its view of what nearby CSG cells are allowed is not always accurate.

FIG. 1 illustrates a relevant wireless environment: a UE 20 is under control of a GERAN cell-A 24 which is in PLMN1 and is handing over to another GERAN cell-B 28 in PLMN2. Nearby there is a CSG cell-C 30 with PLMN-IDa. Cell-A 24 is the UE's serving cell and so the UE obtains from cell-A 24 its (first) whitelist 101, which the cell-A 24 gets from its MSC-A 22 and which includes PLMN1 and list EPLMN1. Along with the CSG IDs, this is the whitelist the UE 20 has stored in its memory. The valid PLMNs for the UE 20 in cell-B 28 are in its (second) whitelist, which cell-B 28 obtains from its MSC-B 26 and which includes PLMN2 and EPLMN2. For this UE 20, CSG cell-C 30 with PLMN-IDa may not be an allowed cell in cell-A 24 (if PLMN-IDa is not within the set {PLMN1, EPLMN1}) but it could be an allowed in cell-B 28 (if PLMN-IDa is within the set {PLMN2, EPLMN2}) or vice versa. CSG cell-C 30 is a potential target cell for handover and ideally the mobile station 20 should determine prior to reporting the CSG cell-C whether it is an allowed cell.

In the GERAN dedicated mode upon handover to a cell of a different location area, the location area update (AU) procedure can only be performed after the dedicated connection is released. While a LAU may only be triggered by the UE, unlike the network the UE is not necessarily aware of the change of location area at handover. Thus it is not aware that there may be a change to the PLMN or EPLMN lists. This had not been an issue previously because only recently has mobility to CSG cells been considered.

Mobility to CSG cells in the connected/dedicated mode relies on the ability of the UE to report CSG cells and on the ability of the network to hand the UE over to a previously reported CSG cell. If a UE 20 in the connected/dedicated mode needs to report a UTRAN CSG cell-C 30 as in FIG. 1 which is in cell-B 28, then the CSG access check performed by the UE 20 for the CSG cell-C 30 identified as (CSG-IDa, IDa) may not yield the correct allowed/not allowed decision because the UE 20 does not necessarily have the correct whitelist set {PLMN2, EPLMN2} that is associated with that cell-B 28.

One approach to resolve this issue is noted at document S2-112640, entitled INTERPLMN HANDOVER TO A CSG CELL by Samsung, Nokia Siemens Networks and Huawei [3GPP TSG SA WG2 Meeting #85; Xian, China; 16-20 May 2011]. This document is a change request for 3GPP TS 23.401, and specifically it sets forth that the source network validate the CSG membership of the UE in the target CSG cell using the CSG-ID list of the serving PLMN-ID before allowing the handover. As will be detailed below, this is seen to be only a partial solution for it fails to address the problem in which, due to the UE 20 not having the valid list of EPLMNs, the nearby CSG cell is not even reported by the UE when in fact that nearby cell is an allowed CSG cell.

Embodiments of these teachings detailed below resolve the above problems in correctly identifying handover CSG cells across different PLMNs.

SUMMARY

In a first exemplary embodiment of the invention there is an apparatus comprising at least one processor and at least one memory storing a computer program. In this embodiment the at least one memory with the computer program is configured with the at least one processor to cause the apparatus to at least: detect that for a user equipment there is a change to at least one of a PLMN and a list of equivalent PLMNs between a serving cell and a target cell, and thereafter send to the user equipment an indication of the detected change during a handover of the user equipment in dedicated or connected mode from the serving cell to the target cell.

In a second exemplary embodiment of the invention there is a method comprising: detecting that for a user equipment there is a change to at least one of a PLMN and a list of equivalent PLMNs between a serving cell and a target cell, and thereafter sending to the user equipment an indication of the detected change during a handover of the user equipment in dedicated or connected mode from the serving cell to the target cell.

In a third exemplary embodiment of the invention there is a computer readable memory storing a computer program, in which the computer program comprises: code for detecting that for a user equipment there is a change to at least one of a PLMN and a list of equivalent PLMNs between a serving cell and a target cell, and code for sending to the user equipment an indication of the detected change during a handover of the user equipment in dedicated or connected mode from the serving cell to the target cell.

In a fourth exemplary embodiment of the invention there is an apparatus for use in a user equipment for maintaining closed subscriber group cells, the apparatus comprising at least one processor and at least one memory storing a computer program. In this embodiment the at least one memory with the computer program is configured with the at least one processor to cause the apparatus to at least: during a handover of a user equipment in a dedicated or connected mode from a serving cell to a target cell, receive signaling indicating that there is a change to at least one of a public land mobile network PLMN and a list of equivalent PLMNs between a serving cell and a target cell, and utilize at least one updated PLMN to check whether a private cell is allowed for the user equipment.

In a fifth exemplary embodiment of the invention there is a method for use in maintaining closed subscriber group cells in a user equipment, the method comprising: during a handover of the user equipment in a dedicated or connected mode from a serving cell to a target cell, the user equipment receiving signaling indicating that there is a change to at least one of a public land mobile network PLMN and a list of equivalent PLMNs between a serving cell and a target cell, and the user equipment utilizing at least one updated PLMN to check whether a private cell is allowed for the user equipment.

In a sixth exemplary embodiment of the invention there is a computer readable memory storing a computer program, in which the computer program comprises: code for, during a handover of a user equipment in a dedicated or connected mode from a serving cell to a target cell, receiving signaling indicating that there is a change to at least one of a public land mobile network PLMN and a list of equivalent PLMNs between a serving cell and a target cell, and code for utilizing at least one updated PLMN to check whether a private cell is allowed for the user equipment.

These and other embodiments and aspects are detailed below with particularity.

BRIEF DESCRIPTION OF THE DRAWING

FIG. 3A is a new type 1 information element entitled "PLMN/EPLMNList_CHANGE Indication" for implementing these teachings in accordance with an exemplary embodiment.

FIG. 3B is a table defining the information element of FIG. 3A in accordance with an exemplary embodiment.

FIGS. 4A-B are logic flow diagrams that each illustrates the operation of a method, and a result of execution of computer program instructions embodied on a computer readable memory, in accordance with the exemplary embodiments of this invention.

DETAILED DESCRIPTION

The UE 20 may be served by a different location area in a different PLMN than the one in which it last made a registration update such that this PLMN and/or the associated list of EPLMNs may be different from the UE's registered PLMN and EPLMN list obtained at the last registration update, e.g. across country borders. This is the FIG. 1 scenario. The network side may be aware of the different location areas but the UE upon a handover from serving cell-A 24 to target cell-B 28 will not know that there is a change of location area. And so the conventional access check on CSG 30 performed by the UE 20 utilizing potentially obsolete PLMN and EPLMN lists can yield the following two distinct errors. The first is termed a false match, in which a CSG cell 30 that the UE 20 determines as allowed (and hence possibly reported as a handover candidate) may not be an allowed CSG cell for that UE 20.

The second is termed a missed match, in which an allowed CSG cell 30 may not be determined by the UE 20 as allowed (and hence not reported by the UE 20 at all).

Figure 1:
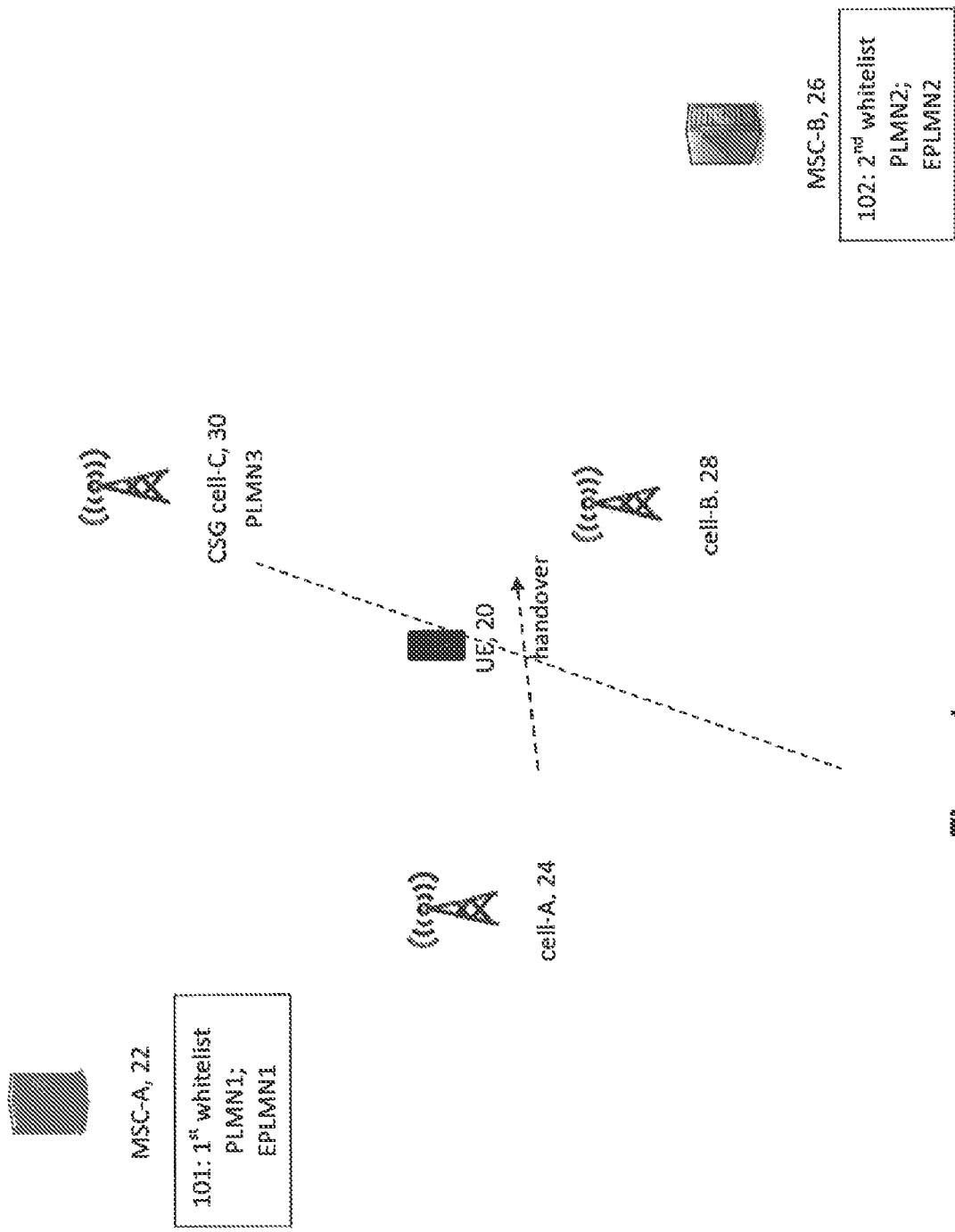
FIG. 1 is a schematic diagram illustrating an environment in which embodiments of the invention may be practiced to advantage.

These are detailed with respect to the example at FIG. 1. The UE 20 is in a cell 24 under PLMN1 and has EPLMN List 1 where PLMN1 is the registered PLMN (rPLMN=PLMN1) of the UE 20. The UE 20 is handed over to a new cell 28 which is in PLMN2 (with EPLMN List 2). As the mobile station 20 is in dedicated mode no LAU takes place in the UE 20 which still assumes that rPLMN=PLMN1, and still uses the EPLMN List 1 since the UE is still using its previously stored {PLMN1, EPLMN1} after the handover to the new cell 28. The UE 20 does not know that in the new cell 28 PLMN2 and EPLMN List 2 apply. The UE 20 then identifies the CSG cell-C 30 as having CSG IDa and PLMN IDa and performs an access check using its stored whitelist which has {PLMN1, EPLMN1}.

In a first example this access check shows CSG cell-C 30 is an allowed CSG cell because CSG IDa and PLMN IDa are in the UE's stored CSG whitelist which has {PLMN1, EPLMN1}. The false match error occurs if PLMN-IDa is equal to one PLMN of {PLMN1; EPLMN1} resulting in a match but where in fact the PLMN IDa is not equal to one of the correct MAN IDs {PLMN2, EPLMN2}. The UE 20 has erroneously determined that the CSG cell-C 30 is allowed for it and the UE 20 may incorrectly report CSG cell-C 30. The access check should not have passed but did, leading to the UE 20 reporting to the new cell 28 the CSG cell-C 30 parameters which represents a large GERAN signaling load, all wasted effort in this case.

In a second example this access check shows CSG cell-C 30 is not an allowed CSG cell because while CSG-IDa and PLMN-IDa are in the correct (second) CSG Whitelist, PLMN-IDa is not equal to one of {PLMN1; EPLMN1} which the UE 20 incorrectly still considers valid. The missed match error occurs because the PLMN-IDa is equal to one of the correct PLMN IDs {PLMN2, EPLMN2} but the UE 20 finds no match for it in its current list {PLMN1, EPLMN1}. The UE 20 has erroneously determined that the CSG cell-C 30 is not allowed (or equivalently has not determined it as allowed) and so the UE 20 will not report it to the new cell 28. The access check should have passed but did not, leading to the UE 20 not handing over to the allowed CSG cell-C 30 despite that it might be the best handover candidate. It is this missed match which the document S2-112640, referenced in the background section above, does not appear to address.

Note that in this second example network sharing may apply. Network sharing occurs when a cell is shared by more than one PLMN. For network sharing the different PLMNs sharing this CSG cell-C 30 need to be taken into account, if broadcast in this new cell 28, in the above examples it is assumed that PLMN2 and the list of PLMNs PLMN and other PLMNs) sharing this cell can be used interchangeably.

The exemplary embodiments presented herein resolve both the above errors by providing for a detection whether the UE's registered PLMN and EPLMN list which were used in the old cell 24 are made invalid by the PLMN and associated EPLMN list in the new cell 28. This detection may be done by the UE (after handover from old serving cell 24 to target/new serving cell 28), or by the network (prior to handover from old serving cell 24 to target/new serving cell 28), or by both. In one variation, based on the detection a registration update of the UE in dedicated mode is made after successful completion of the handover to the new cell 28, in order to update the UE 20 with its new registered PLMN and EPLMN list. In another variation, based on the detection the network 28 performs the access check with the correct {PLMN, EPLMN list} for this UE 20 in the new cell 28 for each CSG cell that the UE 20 reports in the new cell 28 in dedicated/connected mode to correctly determine whether the reported CSG cell 30 is allowed or not, at least as long as no registration update is made for or by the UE in the new cell 28.

While the above procedure is seen to be most advantageous in the circuit-switched domain, it can also be used in the packet-switched domain when the registered/serving PLMN and EPLMN list is expected to change but where no update to location area, routing area or tracking area is to be performed after the handover from cell 24 to cell 28.

Further are described various embodiments for implementing the above detection of whether the UE's registered PLMN and EPLMN list from the old cell 24 are invalid in the new cell 28. Each of these is noted as resolving the false match or the missed match errors to one extent or another. Afterwards are detailed various suggested combinations of the different embodiments which provide a more complete solution to the dual errors noted above by example. Combinations other than those suggested may of course be implemented without departing from the scope of these teachings.

Whether the old PLMN and EPLMN list are invalid for the new cell 28 may be detected by comparing the PLMN sets. Stated more concisely, this detection tests for at least one of the following intersections of sets:

$$\{rPLMN, EPLMN\ list\}_{old\ cell} \cap \{PLMN, EPLMN\ list\}_{new\ cell} = \varnothing;\ \text{or}$$

$$\{rPLMN, EPLMN\ list\}_{old\ cell} \cap \{PLMN\}_{new\ cell} = \varnothing;\ \text{or}$$

$$\{rPLMN\}_{old\ cell} \cap \{PLMN, EPLMN\ list\}_{new\ cell} = \varnothing;$$

where rPLMN is the registered PLMN of the old cell (cell 24 in FIG. 1). As noted above, if the detection is done by the network (e.g., by cell-B 28 and/or MCS-B 26 in FIG. 1) it is done during preparation for handing over the UE/mobile station 20 to a private cell (CSG cell-C 30 in FIG. 1), and if done by the UE/mobile station 20 it may be done during execution of the handover from cell 24 to cell 28 itself or after the successful completion of that handover.

In a first embodiment for the network side implementation of the PLMN validity detection, the UE does not report CSG cells until/unless there is a registration update procedure. In this first embodiment the higher network node MSC-B 26 and subsequently the old cell 24 indicates the result of the detection in the handover signaling, and that the UE/mobile station 20 is notified of this detection at handover (for example, in the RR HANDOVER COMMAND message from the old cell 24). This notification is used to order the UE/mobile station 20 to not report any CSG cells 30 while in the dedicated mode after successful completion of the handover to the new cell 28, at least as long as no successful registration update is made in the LIE/mobile station 20 in the new cell 28. This first embodiment resolves the false match problem detailed by example above. The notification is in one implementation provided via a newly introduced indicator in the handover signaling, termed herein a PLMN/EPLMNList Change Indicator. In this case the PLMN/EPLMNList Change Indicator is set by the network. Examples of such a PLMN/EPLMNList Change Indicator are detailed below with respect to FIGS. 3A-B.

In a second embodiment the UE/mobile station 20 continues to report to the network/new cell 28 any CSG cells 30 which pass the UE's access check with the {PLMN,EPLMN list}$_{old\ cell}$ until there is a registration update, irrespective of the {PLMN, EPLMN list} change. This embodiment also has the network itself do the PLAIN validity detection similar in concept to that described in S2-112640 (see above), but in this case the network/new cell 28 performs the access check with the correct {PLMN, EPLMN list}$_{new\ cell}$ in the new cell 28 for each CSG cell reported by the UE/mobile station 20 in the new cell while the UE/mobile station 20 is in the dedicated mode after successful completion of the handover. The network/new cell 28 continues performing this check at least until there is a successful registration update made in the UE/mobile station 20 in the new cell 28. This registration update gives the UE/mobile station 20 the correct {PLMN, EPLMN list}$_{new\ cell}$ which enables the UE 20 to accurately determine whether any CSG cell is allowed or not. This second embodiment also resolves the false match problem detailed by example above, but not completely.

Conventionally it is the UE/mobile station 20 which initiates registration or location area updates. In a third embodiment also in which the PLMN validity detection is implemented by the network/new cell 28, the network triggers an unsolicited registration update (not requested by the UE) in the UE/mobile station 20 while that UE/mobile station 20 is in the dedicated mode. Since currently there is no mechanism for the network to initiate a registration update, in one implementation for this third embodiment the UE/mobile station 20 first indicates to the network/new cell 28 that it supports receiving an unsolicited registration update message while in the dedicated mode. This triggering occurs after successful completion of the handover to the new cell 28. In one aspect this third embodiment is implemented by the formerly serving network (old cell-A, 24) sending a NAS or RR message, which includes the PLMN ID of the PLMN which is now serving the HE/mobile station 20 in the new cell 28 as well as the associated EPLMN list, for use by the UE/mobile station 20 in the new cell 28 so the UE/mobile station 20 can update its registered PLMN and EPLMN list accordingly. The EPLMN list is normally conveyed by the NAS, so it is a simpler implementation that NAS signaling be used for sending the new cell 28 the set {PLMA, EPLMN}$_{new\ cell}$ as well. By example the set {PLMN, EPLMN}$_{new\ cell}$ may be sent in a LOCATION UPDATING ACCEPT message from the old cell 24 to the UE/mobile station 20. This third embodiment addresses the missed match problem noted by example above. The various suggested combinations of embodiments noted below address how to handle the CSG cells before the registration update is made in the new cell 28.

In a fourth embodiment the network may provide to the UE/mobile station 20 (which is in the dedicated mode) a system information message which contains the location area identifier of the new cell 28 (for example, a SYSTEM INFORMATION TYPE 6 SI6 message). The location area identifier includes the PLMN ID of the new cell 28 along with the location area code. This is possible in conventional GERAN but restricted to the use of voice group call service VGCS and voice broadcast service VBS. This fourth embodiment expands the use of the location area identifier in the system information type 6 message when both the old cell 24 and the UE/mobile station 20 support interworking with CSG cells 30 while the UE/mobile station 20 is in the dedicated mode. Note that the network/old cell 24 in this case would not necessarily make a PLMN validity detection before sending the SI6 message. The UE/mobile station 20 in the dedicated mode can use the PLMN ID it received in the SI6 to detect that {rPLMN, EPLMN list}$_{old\ cell} \cap$ {PLMN}$_{new\ cell} = \emptyset$, and thus the UE/mobile station 20 would detect the PLMN validity itself.

For the case of network sharing where a cell is shared by more than one PLMN, the above assumes that PLMN$_{new\ cell}$ and MultiplePLMNs$_{new\ cell}$ can be used interchangeably, where the term MultiplePLMNs$_{new\ cell}$ is the list of PLMNs sharing the new cell 28. In case of network sharing, the network 24 should indicate in the system information type 6 message the PLMN ID of the PLMN on which the LIE/mobile station 20 is registered (as per the handover) even if the UE/mobile station 20 is yet to know it is registered in this (new) PLMN. It is not necessary that the Old cell 24 needs to indicate the list of PLMNs sharing the new cell 28, but in case it does the UE/mobile station 20 should not take into account any PLMN in this list that would be part of the list of forbidden PLMNs (unless of course the UE/mobile station 20 is attached to the new/restricted cell 30 for emergency services).

In this fourth embodiment, the PLMN validity detection by the UE/mobile station 20 can be triggered by a PLMN validity detection by the old cell 24 and the associated signaling from the old cell 24 at the handover, such as the above-mentioned RR HANDOVER COMMAND message. Thereafter, based on the UE/mobile station's PLMN validity detection the UE/mobile station 20 in the dedicated mode can request a registration update from the new cell 28 through NAS signaling, such as the above-mentioned LOCATION UPDATING REQUEST message. This will trigger in the new cell 28 a conventional (solicited) registration update by NAS, for example a LOCATION UPDATING ACCEPT message which the new cell 28 sends to the UE/mobile station 20 to indicate the PLMN and EPLMN list in the new cell 28. From this the UE/mobile station 20 can update its memory with the new registered PLMN and EPLMN list {PLMN2, EPLMN2} accordingly.

The fourth embodiment addresses the missed match problem only, and so a complete solution (noted below) needs to also address the false match problem. Additionally, one aspect for implementing this fourth embodiment is for the old cell 24 to signal to the UE/mobile station 20 that it is allowed to send, while in the dedicated mode, a request for registration update. In the $3^{rd}$ embodiment the new cell 28 sends an LAU Accept message without receiving the LAU Request message from the mobile station 20 and only after the successful handover, while in the $4^{th}$ embodiment the mobile station 20 as soon as it detects that the location area has changed based on the received LAI in system information in SI6 will trigger the LAU by sending the Location Area Update Request message to the new cell 28. Unlike this fourth embodiment, in conventional GERAN in dedicated mode this procedure can only be performed after the release of the connection thus not during an ongoing call.

In a variation of the fourth embodiment there is only a partial registration update while the UE/mobile station 20 is in the dedicated mode. It is partial because the network does not provide the full EPLMN list$_{new\ cell}$, to the UE/mobile station 20. As noted above it is conventional practice, restricted to VOCS/VES, that the network provide to a mobile station in dedicated mode the SYSTEM INFORMATION TYPE 6 message which contains the location area identity and therefore the PLMN ID. This SI6 message is expanded as detailed in the teachings above to support the PLMN validity detection when both the old cell 24 and the UE/mobile station 20 support interworking with CSG cells 30 in the dedicated mode. In this variation the network/old cell 24 does not necessarily make a PLMN validity detection itself before sending the SI6 message. Instead, based on the PLMN ID the UE/mobile station 20 receives in SI6 (or another message) the UE/mobile station 20 could itself detect that {rPLMN, EPLMN list}$_{old\ cell} \cap$ {PLMN}$_{new\ cell} = \cap$.

This PLMN validity detection by the UE/mobile station 20 may alternatively be triggered by a PLMN validity detection done by the network itself, and signaled to the UE/mobile station 20 by the old cell 24 at handover such as the above-mentioned RR HANDOVER COMMAND message. In one implementation of this variation to the fourth embodiment, the UE/mobile station 20 in the dedicated mode can perform the PLMN validity check by using the $\{PLMN\}_{new\ cell}$ instead of the $\{rPLMN,\ EPLMN\ List\}_{old\ cell}$ to perform the access check in order to determine whether CSG cells 30 are allowed or not. Or in another implementation of this variation to the fourth embodiment the UE/mobile station 20 in the dedicated mode can perform the PLMN validity check by using the $\{PLMN\}_{new\ cell}$ in addition to the $\{rPLMN,\ EPLMN\ list\}_{old\ cell}$ to perform the access check in order to determine whether CSG cells 30 are allowed or not.

As noted for all of the above embodiments and implementations, they each resolve either the false match or the missed match errors to some extent, but none alone are a complete solution to both those error types. Suggested combinations of the above embodiments to form a complete solution for addressing both error types include at least the following combinations:

the first embodiment with the third embodiment; the second embodiment with the third embodiment;
the first embodiment with the fourth embodiment;
the second embodiment with the fourth embodiment;
the first embodiment with the first implementation of the variation of the fourth embodiment; and
the first embodiment with the second implementation of the variation of the fourth embodiment.

As noted briefly above these solutions are not limited to only handing over from a GERAN cell but are readily extended to other RATs, for example handing over in UTRAN and E-UTRAN where the PLMN/EPLMN list is expected to change but where no location area, routing area or tracking area is to be performed after handover.

Figure 2:
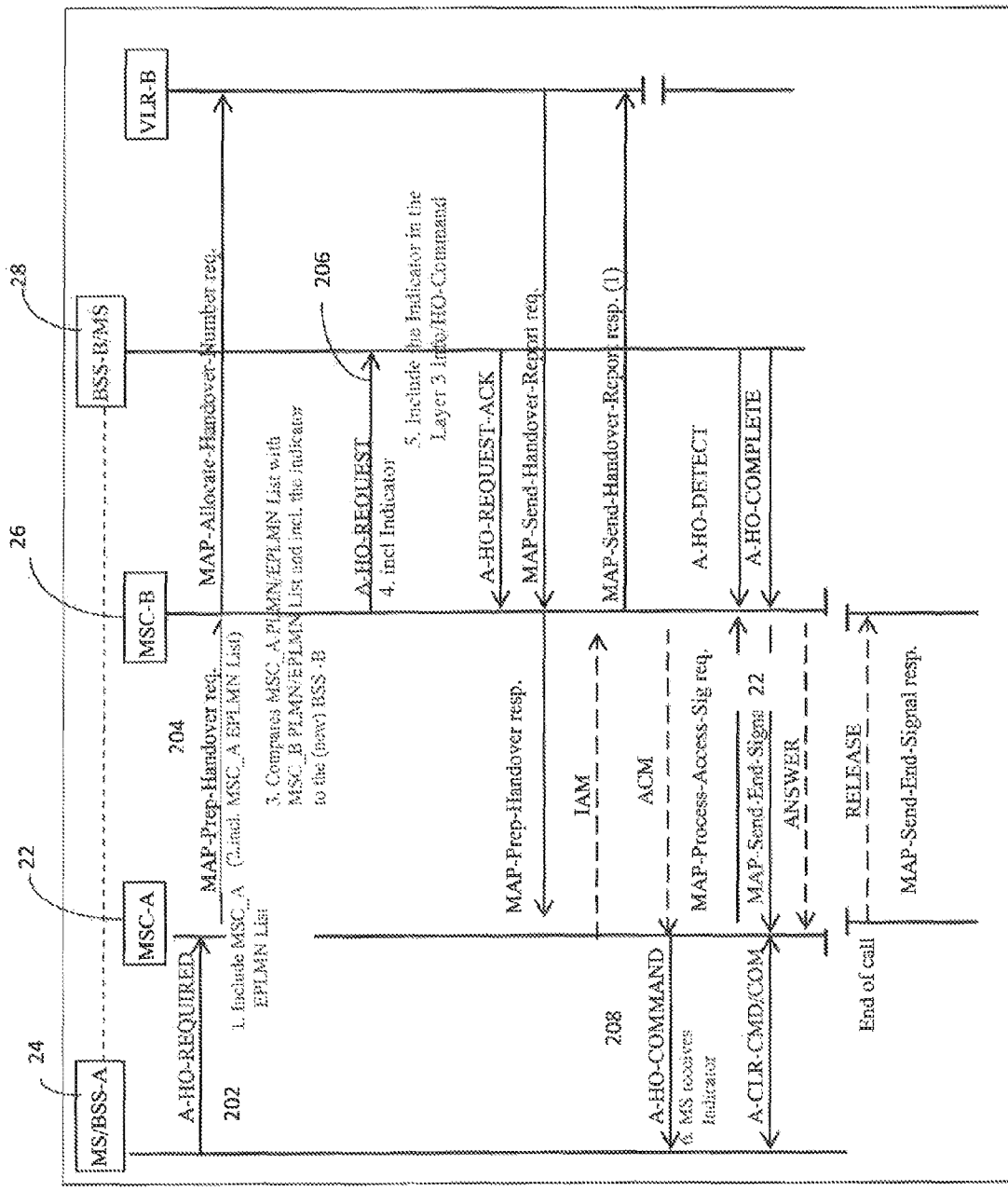
FIG. 2 is a signaling diagram illustrating signaling and actions taken in accordance with a first exemplary embodiment of the invention.

FIG. 2 is a signaling flow diagram illustrating how the new information element (IE) PLMN/EPLMNList CHANGE Indication is added by the old cell 24 to the handover signaling according to various embodiments of these teachings. This information element indicates to the UE/mobile station 20 whether an EPLMN list will change due to the location area change. The signaling in FIG. 2 includes the serving cell 24, the serving cell's MSC 22, the target cell 28 and the target cell's MSC 26. The private/CSG cell is not shown specifically in FIG. 2 but it is in background from which the UE 20 can receive its broadcast PLMN-IDa and CSG-IDa.

The signaling flow is depicted in FIG. 2, which like FIG. 1 has the UE handing over from BSS-A (serving or old cell 24) under control of MSC-A 11 to BSS-B (target or new cell 28) under control of MSC-B 26. The BSS-A 24 will include in its handover required message 202 to its MSC-A 24 the EPLMN1 list which is valid for MSC-A 24. The MSC-A 24 will then signal to the MSC-B 26 a handover prepare message 204 which also includes the EPLMN1 list. MSC-B 26 checks with the visiting location register VLR-B for the handover as is conventional, and compares the PLMN1/EPLMN1 list which is valid for MSC-A 24 against its own PLMN2/EPLMN2 list which is valid for MSC-B 26. MSC-B 26 then includes an indicator in its handover request message 206 to its BSS-B 28, that indicator telling whether or not the PLMN1/EPLMN1 was identical to the PLMN2/EPLMN2. In various of the above embodiments the BSS-B 28 or ESS-A 24 then signals to the UE 20 the indicator, or the PLMN2, or both. Prior to the handover the BSS-A 24 would signal the indicator in the handover command 208. The MSC-B 26 shall be able to set the PLMN/EPLMNList_CHANGE Indicator on the Ainterface (which is the interface between the MSC and the BSS) at steps 3 and 4 in FIG. 2 based on the indicator received from the old MSC-A 24.

One exemplary implementation of the inter-MSC procedure is depicted in steps 1 and 2 in FIG. 2; the MSC-A 24 may also set the E-PLMN List Indicator based on the target cell ID in the Handover Required message 202 if it can determine that another PLMN and E-PLMN list different from its current list is valid in the new cell. So that both the UE 20 and the various network nodes 22, 24, 26, 28 all understand the messaging changes according to these teachings, in 3GPP TS 48.008 may be amended to add the PLMN/EPLMN-List_CHANGE indicator to the Handover Request 206 on the A interface, and 3GPP TSG 44.018 may be amended to add that same indicator to the RR Handover Command 208.

Figure 4A:
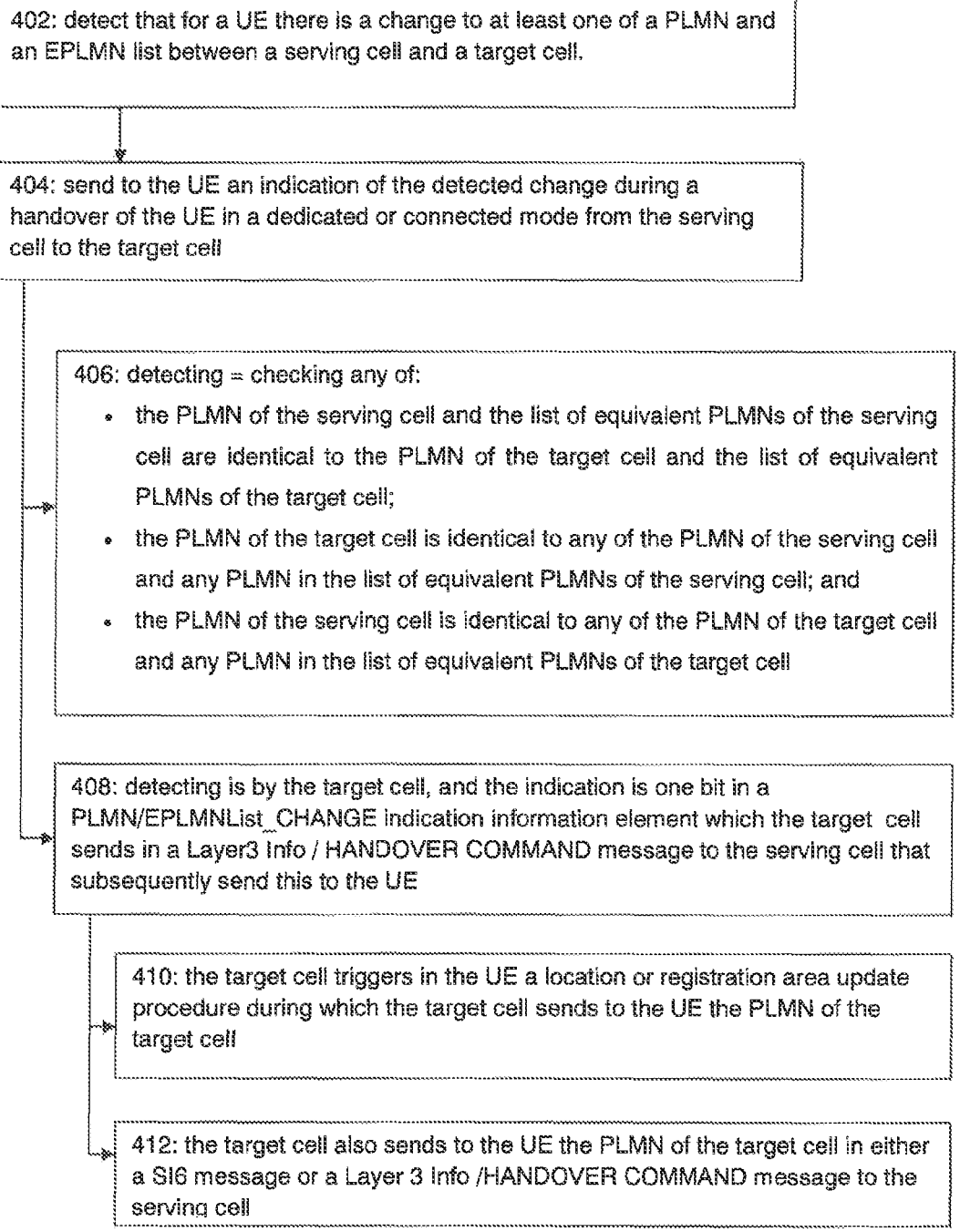

The purpose of the PLMN/EPLMNList_CHANGE Indication information element is to indicate whether the PLMN/EPLMNList_CHANGE in the new cell 28 after handover will change or not, while the UE is in the dedicated mode. FIGS. 3A-B illustrates one exemplary coding for the PLMN/EPLMNList_CHANGE Indication information element, which is a type 1 information element. As can be seen at FIG. 3A, the actual change indicator 302 is a single bit, further explained at FIG. 3B, FIGS. 4A-B are logic flow diagrams which each describes the above exemplary embodiments of the invention. Each represents results from executing a computer program or an implementing algorithm stored in the local memory of the UE 20 (as to FIG. 4B) or one or more of the network elements 22, 24, 26, 28 (as to FIG. 4A), as well as illustrating the operation of a method and a specific manner in which the processor and memory with computer program/algorithm are configured to cause that UE 20 and the various network elements (or one or more components thereof) to operate. The various blocks shown in each of FIGS. 4A-B may also be considered as a plurality of coupled logic circuit elements constructed to carry out the associated function(s), or specific result or function of strings of computer program code stored in a computer readable memory. The serving and target cells recited at FIGS. 4A-B are in the respective positions of the old and new cells in the examples above.

Such blocks and the functions they represent are non-limiting examples, and may be practiced in various components such as integrated circuit chips and modules, and that the exemplary embodiments of this invention may be realized in an apparatus that is embodied as an integrated circuit. The integrated circuit, or circuits, may comprise circuitry (as well as possibly firmware) for embodying at least one or more of a data processor or data processors, a digital signal processor or processors, baseband circuitry and radio frequency circuitry that are configurable so as to operate in accordance with the exemplary embodiments of this invention.

First consider FIG. 4A from the network-side perspective. At block 402 it is detected that for a UE there is a change to at least one of a PLMN and a list of equivalent PLMNs between a serving cell and a target cell. Thereafter at block 404 one of these cells sends to the UE an indication of the detected change during a handover of the UE (which is in a dedicated or connected mode) from the serving cell to the target cell. The further blocks of FIG. 4A represent some of the above specific implementations and may be combined variously with one another to modify or add to blocks 402 and 404.

Block 406 has the detecting from the equations given above. The detecting may be checking any of:
the PLMN of the serving cell and the list of equivalent PLMNs of the serving cell are identical to the PLMN of the target cell and the list of equivalent PLMNs of the target cell;

the PLMN of the target cell is identical to any of the PLMN of the serving cell and any PLMN in the list of equivalent PLMNs of the serving cell; and the PLMN of the serving cell is identical to any of the PLMN of the target cell and any PLMN in the list of equivalent PLMNs of the target cell.

According to the first and second embodiments above, the detecting at block 402 is by the target cell and block 408 provides that the indication is one bit in a PLMN/EPLMN-List_cHANGE indication information element which the serving cell sends in a HANDOVER COMMAND message. In this case it is the target cell that detected the change. The target cell informs the serving cell of that a change was detected, such as through a Layer 3 Information message, and it is the serving cell which informs the information element to the UE.

Adding the third embodiment to block 408, at block 410 the target cell triggers in the UE a location or registration area update procedure during which the target cell sends to the UE the PLMN of the target cell.

Adding the fourth embodiment to block 408, at block 412 the PLMN of the target cell is sent to the UE in either a SI6 message (sent by the target cell) or a HANDOVER COMMAND message (sent by the serving cell). In one implementation of the fourth embodiment the PLMN of the target cell is contained within a location area identifier of the target cell which is included within the SI6 or handover command message; in another implementation the PLMN of the target cell is sent by target cell in a location or registration update procedure that is triggered in the UE by the target cell.

Or for the case of the fourth embodiment alone the indication of block 404 may be the PLMN of the target cell which the serving cell sends in one of a SI6 message or a HANDOVER COMMAND message.

Now consider FIG. 4B from the UE-side perspective. At block 452, during a handover of a HE in a dedicated or connected mode from a serving cell to a target cell, the UE receives signaling indicating that there is a change to at least one of a public land mobile network PLMN and a list of equivalent PLMNs between a serving cell and a target cell. And at block 454 the UE utilizes at least one updated PLMN to check whether a private cell is allowed for the UE. The further blocks of FIG. 4B represent some of the above specific implementations and may be combined variously with one another to modify or add to blocks 452 and 454.

Block 456 modifies block 452 in that the indication is one bit in a PLMN/EPLMNList_CHANGE indication information element which the UE receives from the serving cell in a HANDOVER COMMAND message.

Block 458 has the first embodiment in which the at least one updated. PLMN is obtained during a location or registration area update; and the UE refrains from reporting private cells/CSGs after the handover until the location or registration area update.

Whether or not the UE refrains from reporting, the combined first and third embodiments are represented by block 460 in which the at least one updated PLMN is the PLMN of the target cell that the UE obtains during a location or registration area update that is triggered in the UE by the target cell.

The combined first and fourth embodiments are represented by block 462, in which the at least one updated PLMN comprises the PLMN of the target cell which the apparatus receives from the target cell in one of a system information SI6 message or a location or registration update message. In the fourth embodiment it is the UE that requests of the target cell a location area update in response to receiving the PLMN of the target cell. That PLMN of the target cell may be contained within a location area identifier of the target cell which is included within the SI6 message.

In the first implementation of the fourth embodiment the UE utilizes at block 452 the received PLMN of the target cell in place of or instead of the PLMN of the serving cell and in place of/instead of the EPLMN list of the serving cell to check whether the private/CSG cell is allowed for the UE. In the second implementation of the fourth embodiment the UE utilizes at block 452 the received PLMN of the target cell in addition to the PLMN of the serving cell and in addition to the EPLMN list of the serving cell to check whether the private/CSG cell is allowed for the UE.

Figure 5:
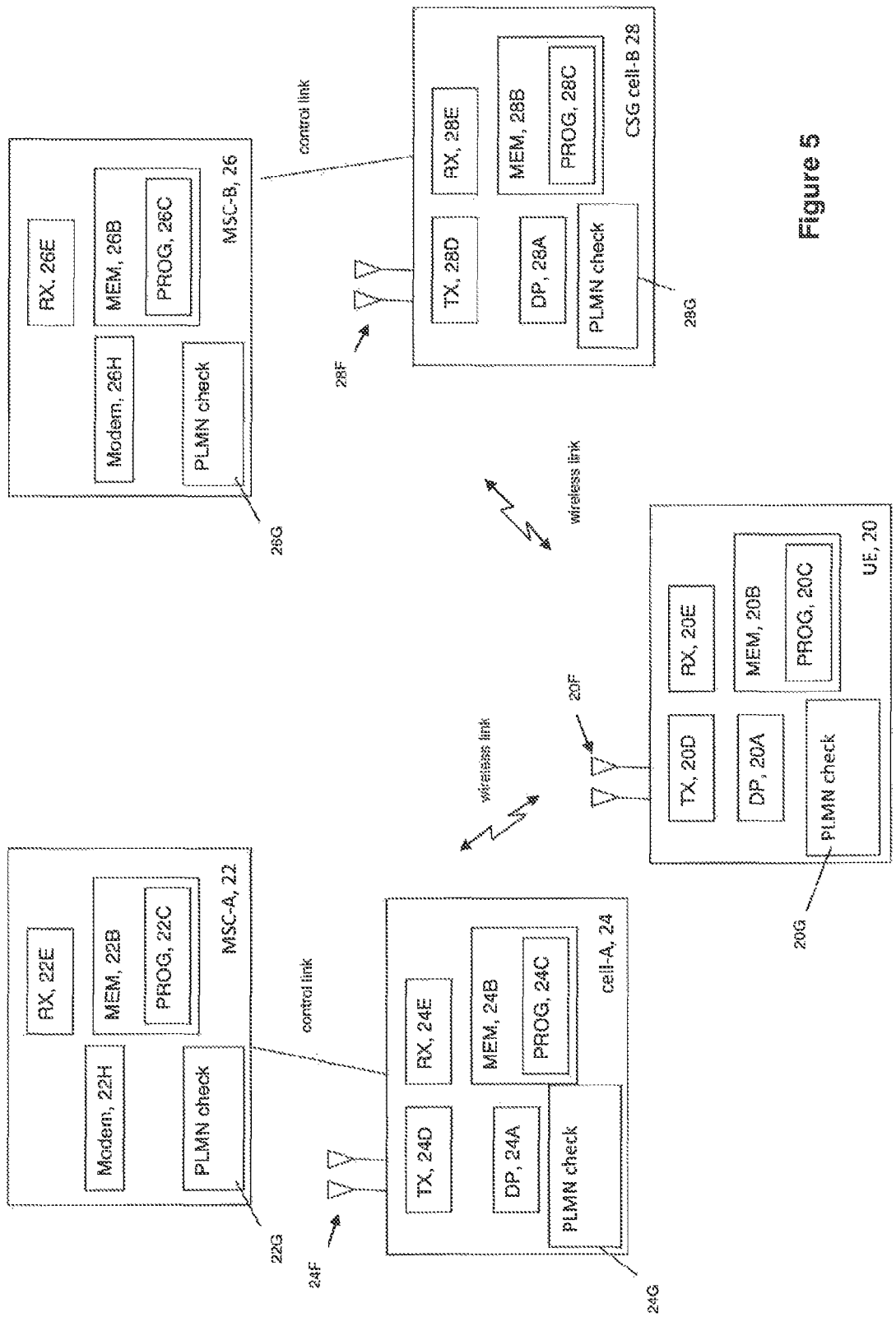
FIG. 5 is a simplified block diagram of various network devices and a UE similar to those shown at FIG. 1, which are exemplary electronic devices suitable for use in practicing the exemplary embodiments of the invention.

Reference is now made to FIG. 5 for illustrating a simplified Nock diagram of various electronic devices and apparatus that are suitable for use in practicing the exemplary embodiments of this invention. In FIG. 5 there is MSC-A 22 controlling cell-A 24 and MSC-B 26 controlling cell-B 28 as in FIG. 1, with a UE/mobile station 20 having wireless links with each and handing over from cell-A 24 to cell-B 28 while checking to see if CSG cell-C 30 is an allowed cell for the UE/mobile station 20.

The UE/mobile station 20 includes processing means such as at least one data processor (DP) 20A, storing means such as at least one computer-readable memory (MEM) 20B storing at least one computer program (PROG) 20C, and also communicating means such as a transmitter TX 20D and a receiver RX 20E for bidirectional wireless communications via one or more antennas 20F. Also shown for the UE 20 at block 20G is the PLMN check which it does in certain embodiments as detailed above.

The MSC-A 22 and also the cell-A 24 similarly includes processing means such as at least one data processor (DP) 22A/24A, storing means such as at least one computer-readable memory (MEM) 22B/24B storing at least one computer program (PROG) 22C/24C, and the cell-A has communicating means such as a transmitter TX 24D and a receiver RX 24E for bidirectional wireless communications with the UE 20 via one or more antennas 22F. The MSC-A 22 has communication means such as a modem 22H for communications over the control link with the cell-A 24. The MSC-A 22 and the cell-A 24 may also have a PLMN checking module or program 22G/24G similar to that of the HE the Similarly, The MSC-B 26 and also the cell-B 28 also includes processing means such as at least one data processor (DP) 26A/28A, storing means such as at least one computer-readable memory (MEM) 26B/28B storing at least one computer program (PROG) 26C/28C, and the cell-B has communicating means such as a transmitter TX 28D and a receiver RX 28E for bidirectional wireless communications with the UE 20 via one or more antennas 281F. The MSC-B 26 has communication means such as a modem 26H for communications over the control link with the cell-B 28. The MSC-B 26 and the cell-B 28 may also have a PLMN checking module or program 26G/280 similar to that of the UE 20.

While a modem is shown for the MSCs 22, 26, the UE 20 as well as the cell-A 24 and the cell-B 28 are also assumed to include a modem, such as for example in a RF front end chip which also carries their respective transmitters and receivers.

At least one of the PROGs 20C in the UE 20 is assumed to include program instructions that, when executed by the associated DP 20A, enable the device to operate in accordance with the exemplary embodiments of this invention, as detailed above. The various MSCs 22, 26 as well as the cells 24, 28 also have software stored in their respective MEMs to implement certain aspects of these teachings. In these regards the exemplary embodiments of this invention may be implemented at least in part by computer software stored on the MEM 20B, 2213, 24B, 26B, 28B which is executable by the DP 20A of the UE 20 and/or by the DP 22A/24A/26A/28A of the respective network nodes 22, 24, 26, 28, or by hardware, or by a combination of tangibly stored software and hardware (and tangibly stored firmware). Electronic devices implementing these aspects of the invention need not be the entire devices as depicted at FIG. 5, but exemplary embodiments may be implemented by one or more components of same such as the above described tangibly stored software, hardware, firmware and DP, or a system on a chip SOC or an application specific integrated circuit ASIC.

Various embodiments of the computer readable MEMs 20B, 22B, 2413, 2613 and 2813 include any data storage technology type which is suitable to the local technical environment, including but not limited to semiconductor based memory devices, magnetic memory devices and systems, optical memory devices and systems, fixed memory, removable memory, disc memory, flash memory, DRAM, SRAM, EEPROM and the like. Various embodiments of the DPs 20A, 22A, 24A, 26A and 28A include but are not limited to general purpose computers, special purpose computers, microprocessors, digital signal processors (DSPs) and multi-core processors.

Further, some of the various features of the above non-limiting embodiments may be used to advantage without the corresponding use of other described features. The foregoing description should therefore be considered as merely illustrative of the principles, teachings and exemplary embodiments of this invention, and not in limitation thereof.

The invention claimed is:

1. An apparatus comprising a user equipment for use in maintaining closed subscriber group cells, the apparatus comprising a processing system arranged to cause the apparatus to:

during a handover of the user equipment in a dedicated or connected mode from a serving cell to a target cell, receive signaling indicating that there is a change to at least one of a public land mobile network PLMN and a list of equivalent PLMNs between a serving cell and a target cell, and utilize at least one updated PLMN to check whether a private cell is allowed for the user equipment;

the at least one updated PLMN comprises the PLMN of the target cell which the apparatus receives from the target cell in a system information SI6 message;

the processing system is arranged to cause the apparatus to at least further request of the target cell a location area update in response to receiving the PLMN of the target cell;

the PLMN of the target cell is contained within a location area identifier of the target cell which is included within the SI6 message;

the processing system is arranged to cause the apparatus to utilize the received PLMN of the target cell in place of the PLMN of the serving cell and in place of a list of equivalent PLMNs of the serving cell to check whether the private cell is allowed for the user equipment.

2. The apparatus according to claim 1, wherein the indication is one bit in a PLMN/EPLMNList_CHANGE indication information element which is received from the serving cell in a HANDOVER COMMAND message.

3. The apparatus according to claim 1, wherein the at least one updated PLMN is obtained during a location or registration area update; and the processing system is arranged to cause the apparatus to refrain from reporting private cells after the handover until the location or registration area update.

4. The apparatus according to claim 1, wherein the at least one updated PLMN is the PLMN of the target cell which the user equipment obtains during a location or registration area update that is triggered in the user equipment by the target cell.

5. The apparatus according to claim 1, wherein the processing system is arranged to cause the apparatus to utilize the received PLMN of the target cell in addition to the PLMN of the serving cell and in addition to a list of equivalent PLMNs of the serving cell to check whether the private cell is allowed for the user equipment.

* * * * *